US011198423B2

(12) United States Patent
Nakano (10) Patent No.: US 11,198,423 B2
(45) Date of Patent: Dec. 14, 2021

(54) CONTROLLER AND CONTROL METHOD FOR HYBRID VEHICLE

(71) Applicant: TOYOTA JIDOSHA KABUSHIKI KAISHA, Toyota (JP)

(72) Inventor: Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 143 days.

(21) Appl. No.: 16/787,454

(22) Filed: Feb. 11, 2020

(65) Prior Publication Data
US 2020/0298817 A1    Sep. 24, 2020

(30) Foreign Application Priority Data

Mar. 20, 2019    (JP) .............................. JP2019-052551

(51) Int. Cl.
*B60W 10/06*    (2006.01)
*B60W 10/08*    (2006.01)
(Continued)

(52) U.S. Cl.
CPC ............ *B60W 10/06* (2013.01); *B60W 10/08* (2013.01); *B60W 20/40* (2013.01); *F02N 11/0803* (2013.01)

(58) Field of Classification Search
CPC ...... B60W 10/06; B60W 20/40; B60W 10/08; B60W 2510/0685; B60W 2710/0627; B60W 2510/0275; B60W 2510/02; B60W 10/02; B60W 30/18009; B60W 2710/021; B60W 2710/06; F02N 11/0803; F02N 5/04; F02N 11/0829; F02N 99/002; F02N 2300/2002; F02N 11/04; F02N 2019/002; F02N 19/005; F02N 2019/008;
(Continued)

(56) References Cited

U.S. PATENT DOCUMENTS 6,250,270 B1 *    6/2001    Ahner ...................... F02N 5/04
                                                          123/179.3
6,997,156 B2 *    2/2006    Tanei ...................... F02D 27/02
                                                          123/179.3
(Continued)

FOREIGN PATENT DOCUMENTS

DE    102009046531 A1    5/2011
EP         2 754 598 A1    7/2014
(Continued)

*Primary Examiner* — Sizo B Vilakazi
*Assistant Examiner* — Brian R Kirby
(74) *Attorney, Agent, or Firm* — Oliff PLC (57) ABSTRACT

A controller for a hybrid vehicle restarts an engine in a start mode selected from multiple start modes. The multiple start modes include a first start mode of starting combustion in the engine when a clutch starts transmitting torque and a second start mode of starting combustion in the engine after the clutch starts transmitting torque. The controller is configured to, in a case in which the engine is restarted in the second start mode, measure a cranking start time from when engagement of the clutch is commanded to when transmission of the torque through the clutch is started, and only when measurement of the cranking start time has been completed after the vehicle is activated, restart the engine in the first start mode.

4 Claims, 5 Drawing Sheets

(51) Int. Cl.
*F02N 11/08* (2006.01)
*B60W 20/40* (2016.01)

(58) Field of Classification Search
CPC ...... F02N 11/0844; Y02T 10/40; Y02T 10/62; B60K 6/387; B60K 2006/4825; B60K 6/48; F02D 41/042; F02D 41/062
USPC .......................... 700/22; 701/113; 123/179
See application file for complete search history.

(56) References Cited

U.S. PATENT DOCUMENTS

| | | | | |
|---|---|---|---|---|
| 7,335,133 | B2* | 2/2008 | Katou | F16H 61/20 |
| | | | | 477/167 |
| 8,162,113 | B2* | 4/2012 | Nakagawara | F16D 48/066 |
| | | | | 192/3.58 |
| 2007/0275810 | A1* | 11/2007 | Sinojima | F16H 37/086 |
| | | | | 475/216 |
| 2009/0271095 | A1* | 10/2009 | Kojima | F02N 11/0814 |
| | | | | 701/113 |
| 2013/0150206 | A1* | 6/2013 | Nissato | B60W 20/10 |
| | | | | 477/5 |
| 2013/0157806 | A1* | 6/2013 | Koyama | B60W 20/00 |
| | | | | 477/5 |
| 2014/0277890 | A1* | 9/2014 | Ideshio | F02N 11/0851 |
| | | | | 701/22 |
| 2015/0329105 | A1* | 11/2015 | Matsui | F16D 48/062 |
| | | | | 701/22 |
| 2015/0360673 | A1* | 12/2015 | Yoshida | B60W 10/02 |
| | | | | 477/5 |
| 2015/0367842 | A1* | 12/2015 | Nakanishi | B60K 6/48 |
| | | | | 701/22 |
| 2016/0003207 | A1 | 1/2016 | Kojima | |
| 2016/0040394 | A1* | 2/2016 | Monden | B60W 20/20 |
| | | | | 414/685 |
| 2016/0208761 | A1* | 7/2016 | Nagai | B60W 10/06 |
| 2016/0298559 | A1* | 10/2016 | Matsushita | F02N 11/0862 |
| 2016/0347317 | A1* | 12/2016 | Fukao | B60W 10/107 |
| 2016/0368484 | A1* | 12/2016 | Lee | B60W 10/06 |
| 2017/0198810 | A1* | 7/2017 | Tohta | F16D 48/06 |
| 2017/0297561 | A1* | 10/2017 | Nakanishi | B60K 6/48 |
| 2017/0299000 | A1* | 10/2017 | Jonsson | F16H 61/08 |
| 2018/0209358 | A1* | 7/2018 | Suzuki | F02N 11/04 |
| 2019/0193720 | A1* | 6/2019 | Komuro | B60W 20/40 |

FOREIGN PATENT DOCUMENTS

| | | |
|---|---|---|
| JP | 2010-023660 A | 2/2010 |
| JP | 2015-020702 A | 2/2015 |
| JP | WO2016016708 A1 * | 2/2016 |
| JP | 2018-105200 A | 7/2018 |
| WO | 2014/170962 A1 | 10/2014 |
| WO | 2016/016708 A1 | 2/2016 |
| WO | 2016/051605 A1 | 4/2016 |

* cited by examiner

CONTROLLER AND CONTROL METHOD FOR HYBRID VEHICLE

BACKGROUND

1. Field

The following description relates to a controller and a control method for a hybrid vehicle.

2. Description of Related Art

In hybrid vehicles, the engine is automatically stopped and automatically restarted based on a traveling state. In a controller for a hybrid vehicle disclosed in Japanese Laid-Open Patent Publication No. 2010-23660, when a sufficient amount of electric power is available, only cranking by a motor is performed to start rotating the crankshaft and restart the engine. When a sufficient amount of electric power is not available, in addition to cranking by a motor, combustion is performed in a cylinder with the piston in a stopped state in the expansion stroke, and the combustion torque and the cranking torque are used to start rotating the crankshaft and restart the engine. In the following description, the cylinder with the piston in the stopped state in the expansion stroke is referred to as an "expansion stroke stopped cylinder."

In some hybrid vehicles, the clutch couples the engine to the motor by which cranking is performed, and the clutch is disengaged when the engine is in an automatically stopped state. In such a hybrid vehicle, restarting the engine using the above-described combustion torque and cranking torque may cause the following problem.

In some situations, variations in the response speed of the clutch may prevent cranking from being started by the timing of combustion in the expansion stroke stopped cylinder. The combustion torque generated by combustion in the expansion stroke stopped cylinder is small. Thus, when cranking cannot be started by the timing of combustion in the expansion stroke stopped cylinder, rotation of the crankshaft may not be able to be started, which may result in failure in the engine start, or the engine start may be delayed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a controller for a hybrid vehicle according to an aspect of the present disclosure, the hybrid vehicle includes a motor arranged on a power transmission path between an engine and a wheel and includes a clutch arranged on a portion of the power transmission path between the engine and the motor. The controller is configured to switch between stopping operation of the engine with the clutch disengaged and operating the engine with the clutch engaged. The controller includes processing circuitry configured to select a start mode from multiple start modes and restart the engine in the selected start mode. The multiple start modes include a first start mode of commanding engagement of the clutch and starting combustion in the engine when the clutch starts transmitting torque and a second start mode of commanding engagement of the clutch and starting combustion in the engine after rotation of the engine is started by the torque transmitted from the motor through the clutch. The processing circuitry is configured to, in a case in which the engine is restarted in the second start mode, measure a cranking start time from when engagement of the clutch is commanded to when transmission of the torque through the clutch is started, and only when measurement of the cranking start time has been completed after the vehicle is activated, restart the engine in the first start mode.

In a control method for a hybrid vehicle according to another aspect of the present disclosure, the hybrid vehicle includes a motor arranged on a power transmission path between an engine and a wheel and includes a clutch arranged on a portion of the power transmission path between the engine and the motor. The control method includes switching between stopping operation of the engine with the clutch disengaged and operating the engine with the clutch engaged. The control method also includes selecting a start mode from multiple start modes and restarting the engine in the selected start mode. The multiple start modes include a first start mode of commanding engagement of the clutch and starting combustion in the engine when the clutch starts transmitting torque and a second start mode of commanding engagement of the clutch and starting combustion in the engine after rotation of the engine is started by the torque transmitted from the motor through the clutch. The control method further includes, in a case in which the engine is restarted in the second start mode, measuring a cranking start time from when engagement of the clutch is commanded to when transmission of the torque through the clutch is started, and only when measurement of the cranking start time has been completed after the vehicle is activated, restarting the engine in the first start mode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller and a control method for a hybrid vehicle according to a first embodiment will now be described with reference to FIGS. 1 to 7.

Figure 1:
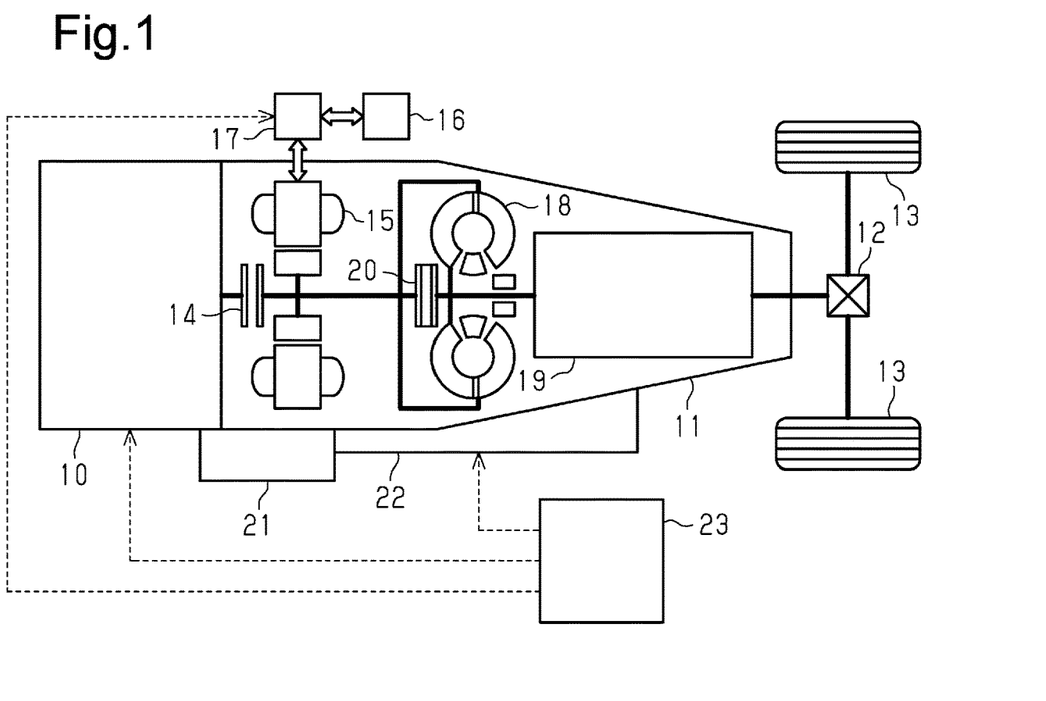
FIG. 1 is a schematic diagram showing the configuration of a controller for a hybrid vehicle and a driving system for the hybrid vehicle according to a first embodiment.

As shown in FIG. 1, the hybrid vehicle includes an engine 10 that is a driving source for traveling. A shifting unit 11 is provided on a power transmission path of the hybrid vehicle from the engine 10 to left and right wheels 13. The shifting unit 11 is coupled to the left and right wheels 13 by a differential apparatus 12 in a drivable manner.

The shifting unit 11 includes a clutch 14 and a motor generator 15 (M/G 15). The M/G 15 is located on the power transmission path from the engine 10 to the wheels 13. The clutch 14 is located on a portion of the power transmission path between the engine 10 and the M/G 15. When supplied with hydraulic pressure, the clutch 14 becomes engaged to allow for power transmission between the engine 10 and the M/G 15. When the supply of hydraulic pressure to the clutch 14 is stopped, the clutch 14 becomes disengaged to disconnect the power transmission between the engine 10 and the M/G 15.

The M/G 15 is connected to an onboard power supply 16 by an inverter 17. The M/G 15 functions as a motor that generates a drive force of the vehicle when powered by the onboard power supply 16 and also functions as a generator that generates electric power for charging the onboard power supply 16 when power is transmitted from the engine 10 or the wheels 13. The electric power transmitted and received to and from the M/G 15 and the onboard power supply 16 is adjusted by the inverter 17.

The shifting unit 11 also includes a torque converter 18 and a multi-speed automatic transmission 19. The torque converter 18 is a fluid coupling that has a torque amplification function. The automatic transmission 19 switches the gear ratio in multiple stages by switching the gear stage. The automatic transmission 19 is located at a portion of the power transmission path between the M/G 15 and the differential apparatus 12. The M/G 15 and the automatic transmission 19 are coupled to each other by the torque converter 18. The torque converter 18 includes a lock-up clutch 20. When supplied with hydraulic pressure, the lock-up clutch 20 becomes engaged to directly couple the M/G 15 to the automatic transmission 19.

The shifting unit 11 further includes an oil pump 21 and a hydraulic pressure control unit 22. The hydraulic pressure generated by the oil pump 21 is supplied by the hydraulic pressure control unit 22 to the clutch 14, the torque converter 18, the automatic transmission 19, and the lock-up clutch 20. The hydraulic pressure control unit 22 includes hydraulic circuits for the clutch 14, the torque converter 18, the automatic transmission 19, and the lock-up clutch 20 and includes various types of hydraulic control valves for controlling the hydraulic pressures in these hydraulic circuits.

In addition, the hybrid vehicle includes a vehicle control unit 23. The vehicle control unit 23 is an electronic control unit including a calculation processor that performs various types of calculation processes for travel control of the vehicle and a storage device that stores programs and data for control. The vehicle control unit 23 performs driving control of the engine 10 as one type of vehicle control. That is, the vehicle control unit 23 is also an engine controller. Further, the vehicle control unit 23 controls the inverter 17 and adjusts the amount of electric power transmitted and received to and from the M/G 15 and the onboard power supply 16 to perform torque control of the M/G 15. The vehicle control unit 23 controls the hydraulic pressure control unit 22 to perform drive control of the clutch 14, the lock-up clutch 20, and the automatic transmission 19. The vehicle control unit 23 receives various types of detection signals such as the vehicle speed and the depression amount of the accelerator pedal (accelerator operation amount).

Figure 2:
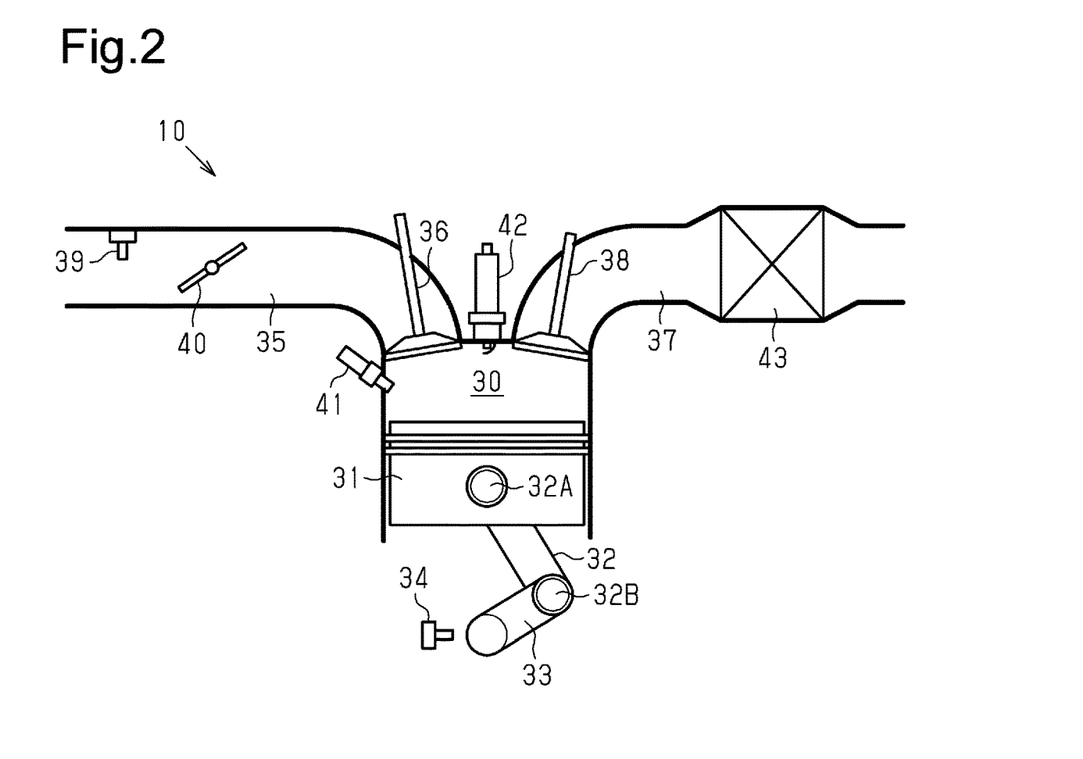
FIG. 2 is a schematic diagram showing the configuration of the engine installed in the hybrid vehicle of FIG. 1.

As shown in FIG. 2, the engine 10 includes a cylinder 30 in which air-fuel mixture is burned. For example, the engine 10 is a V6 engine with six cylinders 30, only one of which is shown in FIG. 2. Each cylinder 30 accommodates a piston 31 such that the piston 31 can reciprocate in the cylinder 30. The piston 31 of each cylinder 30 is coupled to a crankshaft 33, which is an output shaft of the engine 10, by a connecting rod 32. One end of the connecting rod 32 is pivotally coupled to the piston 31 by a piston pin 32A. The other end of the connecting rod 32 is pivotally coupled to the crankshaft 33 by a crank pin 32B. The connecting rod 32 and the crankshaft 33 configure a crank mechanism that converts reciprocating motion of the piston 31 into rotational motion of the crankshaft 33. The engine 10 includes a crank angle sensor 34 that detects a rotation angle of the crankshaft 33.

An intake passage 35, into which intake air is drawn, is connected to each cylinder 30 via an intake valve 36. An exhaust passage 37, out of which exhaust gas is discharged, is connected to each cylinder 30 via an exhaust valve 38. The intake passage 35 includes an airflow meter 39 and a throttle valve 40. The airflow meter 39 detects an intake air flow rate GA, which is the flow rate of intake air flowing through the intake passage 35. The throttle valve 40 adjusts the flow rate of intake air. Further, the engine 10 is provided with a fuel injection valve 41 in correspondence with each cylinder 30. The fuel injection valve 41 injects fuel into the cylinder 30. Each cylinder 30 includes an ignition device 42 that ignites, with spark discharge, air-fuel mixture of the intake air drawn in through the intake passage 35 and the fuel injected by the fuel injection valve 41. The exhaust passage 37 includes a catalyst device 43 that purifies exhaust gas.

The above-described vehicle control unit 23 receives detection signals of the crank angle sensor 34 and the airflow meter 39. Further, the vehicle control unit 23 calculates an engine speed NE from the detection signal of the crank angle sensor 34 as an interruption process executed whenever the crankshaft 33 is rotated by an angle corresponding to a given angle. The vehicle control unit 23 performs an open degree control of the throttle valve 40, a fuel injection control of the fuel injection valve 41, and an ignition control of the ignition device 42 to perform driving control of the engine 10.

Further, the vehicle control unit 23 switches between a first travel mode of traveling by stopping the operation of the engine 10 and a second travel mode of traveling by operating the engine 10 depending on traveling situations, thereby intermittently driving the engine 10. In the first travel mode, the vehicle travels using the power of the M/G 15 with the operation of the engine 10 stopped and the clutch 14 disengaged. In the second travel mode, the vehicle travels using the power of the engine 10 with the engine 10 operated and the clutch 14 engaged. In the second travel mode, travel assist with power driving of the M/G 15 and regenerative power generation with regenerative driving of the M/G 15 are performed depending on traveling situations of the vehicle. For example, the travel mode is switched based on a requested drive force of the vehicle obtained from the vehicle speed and the accelerator operation amount and based on a charge state of the onboard power supply 16.

In the present embodiment, when switching from the second travel mode to the first travel mode, the vehicle control unit 23 increases the open degree of the throttle valve 40 immediately before the crankshaft 33 stops rotating. This causes the crankshaft 33 to stop rotating with the piston 31 located in the proximity of the intake bottom dead center in one of the cylinders 30 of the engine 10. Thus, when the travel mode is switched from the first travel mode to the second travel mode, the engine 10 is started from a state in which the rotation of the crankshaft 33 is in a stopped state with the piston 31 located in the proximity of the intake bottom dead center in one of the cylinders 30 of the engine 10. In the following description, the cylinder 30 with the piston 31 located in the proximity of the intake bottom dead center when the rotation of the crankshaft 33 is in the stopped state is referred to as an "intake bottom dead center stopped cylinder."

Further, the vehicle control unit 23 performs a restart control of the engine 10 when switching from the first travel mode to the second travel mode. The vehicle control unit 23, which is a restart control unit, selects a start mode from multiple start modes including a first start mode and a second start mode and restarts the engine 10 in the selected start mode.

Figure 3:
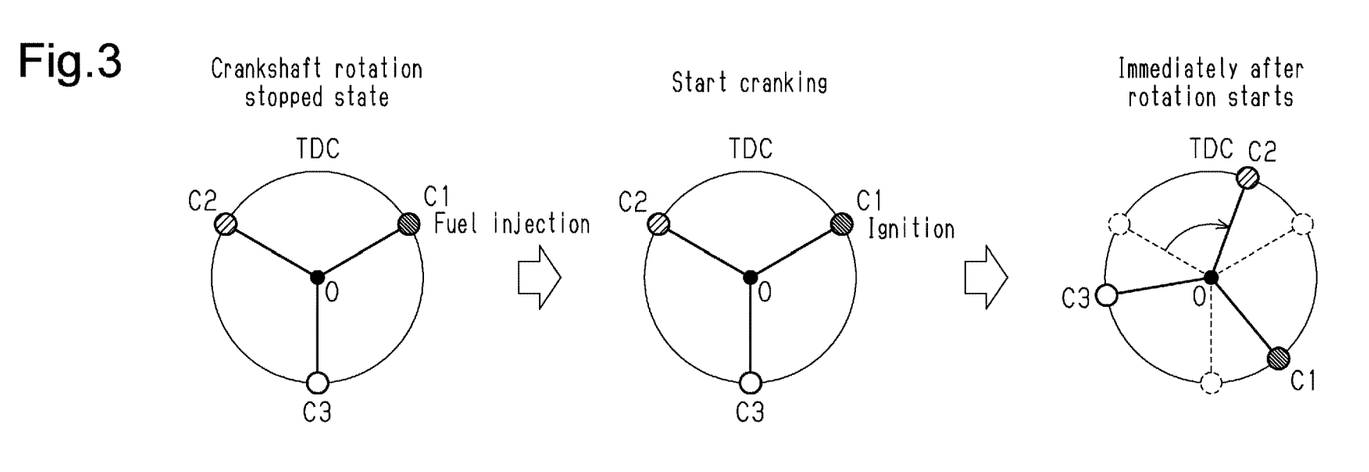
FIG. 3 is a diagram that illustrates restarting of the engine in a first start mode.

Restarting of the engine 10 in the first start mode will now be described with reference to FIG. 3. In FIG. 3, C3 indicates the position of the crank pin 32B in the intake bottom dead center stopped cylinder with reference to a rotation center axis O of the crankshaft 33. In FIG. 3, C2 indicates the position of the crank pin 32B of a cylinder that is burned one time before the intake bottom dead center stopped cylinder, and C1 indicates the position of the crank pin 32B of a cylinder that is burned two times before the intake bottom dead center stopped cylinder. When the rotation of the crankshaft 33 is in the stopped state, the piston 31 is located in the compression stroke in the cylinder that is burned one time before the intake bottom dead center stopped cylinder, and the piston 31 is located in the expansion stroke in the cylinder that is burned two times before the intake bottom dead center stopped cylinder. In the following description, the cylinder with the piston 31 located in the compression stroke when the rotation of the crankshaft 33 is in the stopped state is referred to as a "compression stroke stopped cylinder," and the cylinder with the piston 31 located in the expansion stroke when the rotation of the crankshaft 33 is in the stopped state is referred to as an "expansion stroke stopped cylinder."

In the first start mode, when the switching from the first travel mode to the second travel mode is requested, the transmission of torque from the M/G 15 through the clutch 14 to the crankshaft 33 (i.e., increase in clutch hydraulic pressure to start cranking) is commanded. In addition to this command, fuel is injected into the expansion stroke stopped cylinder. The fuel injection to the expansion stroke stopped cylinder is performed with the rotation of the crankshaft 33 in the stopped state before cranking is started. After the fuel injection, ignition is performed in the expansion stroke stopped cylinder at a timing on which cranking is started, and the rotation of the crankshaft 33 is started using the combustion torque generated in the expansion stroke stopped cylinder and the torque of the M/G 15 transmitted through the clutch 14. Subsequently, fuel injection and ignition are performed in each cylinder 30 in accordance with a given sequence to restart the engine 10. In the following description, the torque of the M/G 15 transmitted to the crankshaft 33 through the clutch 14 before the engine 10 starts is complete is referred to as a "cranking torque."

Figure 4:
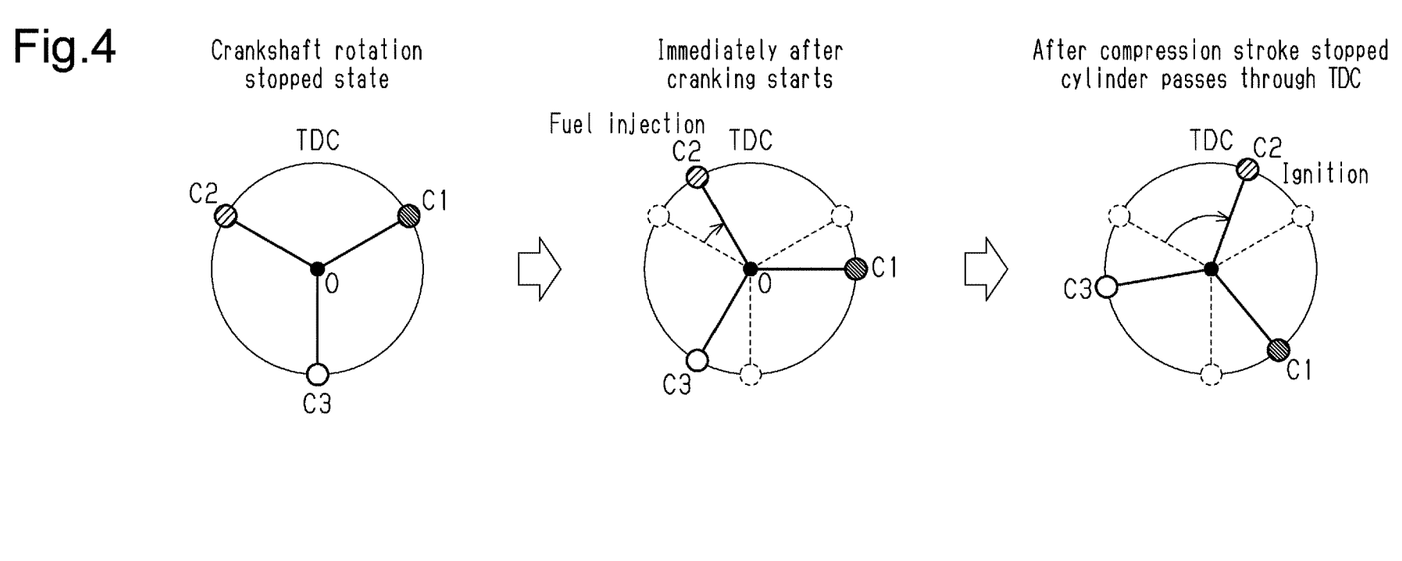
FIG. 4 is a diagram that illustrates restarting of the engine in a second start mode.

Restarting of the engine 10 in the second start mode will now be described with reference to FIG. 4. In the second start mode, when the switching from the first travel mode to the second travel mode is requested, an increase in the clutch hydraulic pressure to start cranking is commanded. In the second start mode, the fuel injection to the expansion stroke stopped cylinder is not performed at this time, and the rotation of the crankshaft 33 is started using only the cranking torque. After the cranking is started, in the compression stroke stopped cylinder, fuel injection is performed before the piston 31 reaches the compression top dead center. Further, ignition is performed after the piston 31 passes through the compression top dead center. Subsequently, fuel injection and ignition are performed in each cylinder 30 in accordance with a given sequence to restart the engine 10.

As described above, both in the first start mode and the second start mode, when the switching from the first travel mode to the second travel mode is requested, an increase in the clutch hydraulic pressure to start cranking is commanded. In the first start mode, the engine 10 is restarted by starting combustion in the expansion stroke stopped cylinder at the same time (or almost at the same time) as when cranking is started. In the second start mode, the engine 10 is restarted by starting combustion in the compression stroke stopped cylinder after cranking is started. As compared to the second start mode of starting rotation of the crankshaft 33 using only cranking torque, the cranking torque required for restarting the engine 10 is small in the first start mode of starting rotation of the crankshaft 33 using the cranking torque and the combustion torque generated in the expansion stroke stopped cylinder. During traveling in the first travel mode, room needs to be left to increase the torque of the M/G 15 by an amount corresponding to the cranking torque required for restarting the engine 10 such that the travel mode can be switched to the second travel mode. Thus, when the engine 10 is restarted in the first start mode, the traveling region where the vehicle can travel in the first travel mode is broader than when the engine 10 is restarted in the second start mode. However, restarting the engine 10 in the first start mode causes the following problem.

Figure 5:
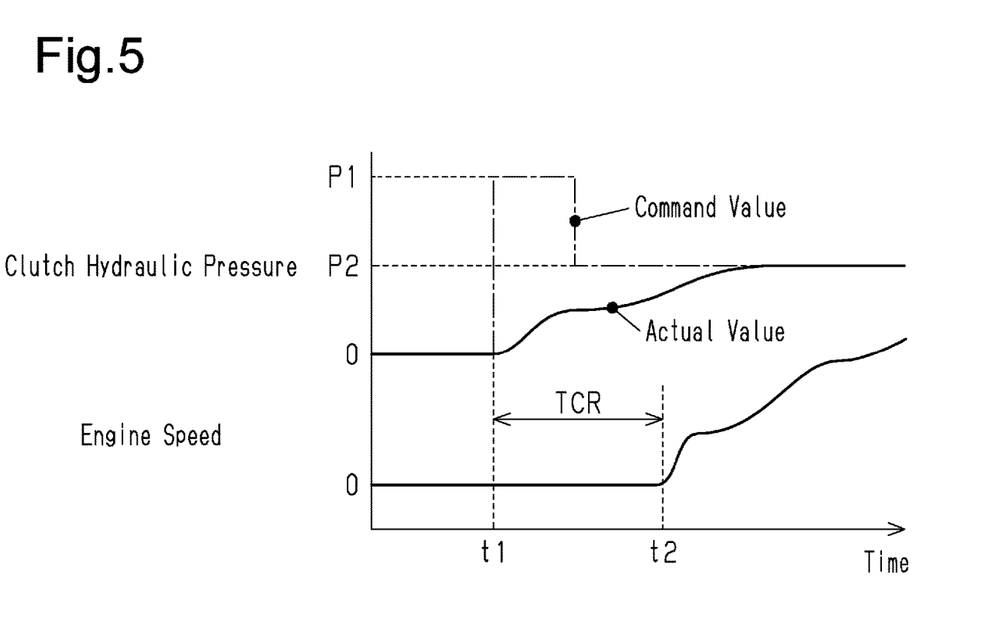
FIG. 5 is a timing diagram illustrating changes in the clutch hydraulic pressure and the engine speed when the engine is restarted in the first start mode.

FIG. 5 shows changes in the clutch hydraulic pressure and engine speed when the engine 10 is restarted in the first start mode. At time t1, when the switching from the first travel mode to the second travel mode is requested, an increase in the clutch hydraulic pressure to start cranking is commanded. A hydraulic pressure P2 in FIG. 5 indicates a target value of the clutch hydraulic pressure during cranking. In the present embodiment, a hydraulic pressure P1, which is higher than the hydraulic pressure P2, is set as a command value of the clutch hydraulic pressure over a fixed period of time after the command of increasing the pressure is started. Then, the command value of the clutch hydraulic pressure is set to the hydraulic pressure P2, which is a target value. This shortens the time for the clutch hydraulic pressure to reach the hydraulic pressure P2.

As described above, in the first start mode, the rotation of the crankshaft 33 is started by performing ignition in the expansion stroke stopped cylinder at time t2, at which cranking is started by an increase in the clutch hydraulic pressure to a value that allows for the transmission of torque after time t1. Variations occur in the time from when an increase in the clutch hydraulic pressure is commanded to when cranking is started, that is, the time from when engagement of the clutch 14 is commanded to when torque can be transmitted through the clutch 14. Particularly, this time is long when the temperature of oil is low and the viscosity of the oil is high. In such a case, cranking cannot be started by the timing of combustion in the expansion stroke stopped cylinder. The combustion torque generated by combustion in the expansion stroke stopped cylinder is small. Thus, when cranking cannot be started by the timing of combustion in the expansion stroke stopped cylinder, rotation of the crankshaft 33 may not be able to be started, which may result in failure in starting of the engine 10, or starting of the engine 10 may be delayed. In the following description, the time from when engagement of the clutch 14 is commanded to when cranking is started is referred to as a "cranking start time TCR."

In the present embodiment, restarting of the engine 10 is controlled in the following manner.

Figure 6:
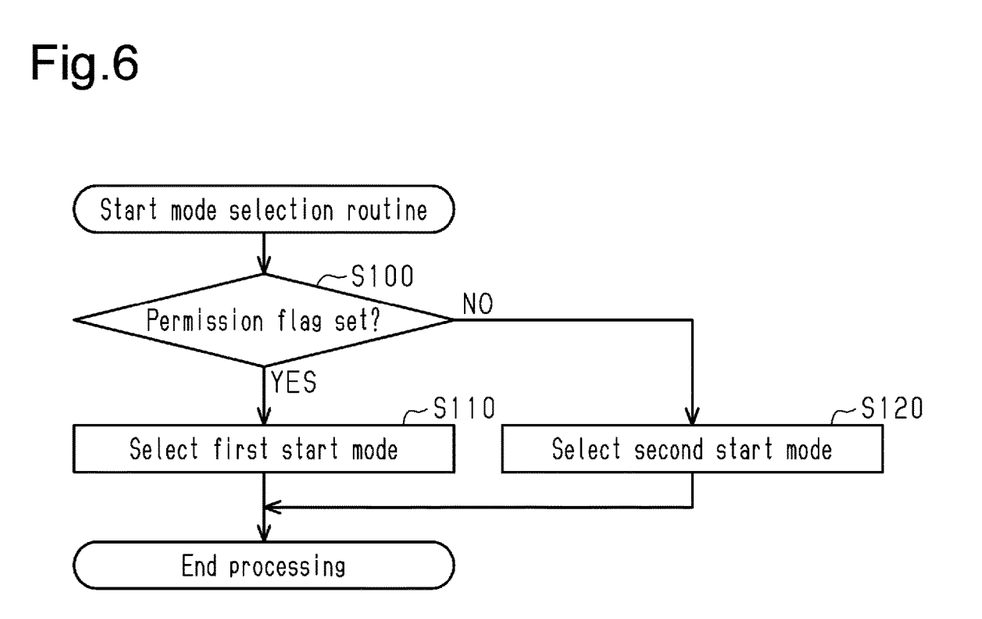
FIG. 6 is a flowchart illustrating a start mode selection routine executed by the controller of FIG. 1.

FIG. 6 shows a flowchart of a start mode selection routine for selecting the start mode of the engine 10 when switching from the first travel mode to the second travel mode. The vehicle control unit 23 executes the processing of the routine when the switching from the first travel mode to the second travel mode is requested. When the routine is started, in step S100, the vehicle control unit 23 first determines whether a permission flag has been set. The permission flag indicates whether starting of the engine 10 in the first start mode is permitted. When the permission flag has been set (YES), the vehicle control unit 23 selects restarting of the engine 10 in the first start mode in step S110. When the permission flag has not been set (NO), the vehicle control unit 23 selects restarting of the engine 10 in the second start mode in step S120. The engine 10 is restarted in the selected start mode. The permission flag has been cleared when the vehicle is activated and set as a result of the processing of a first start mode permission determination routine, which will be described later. The vehicle is activated by, for example, turning on a start switch of the vehicle.

Figure 7:
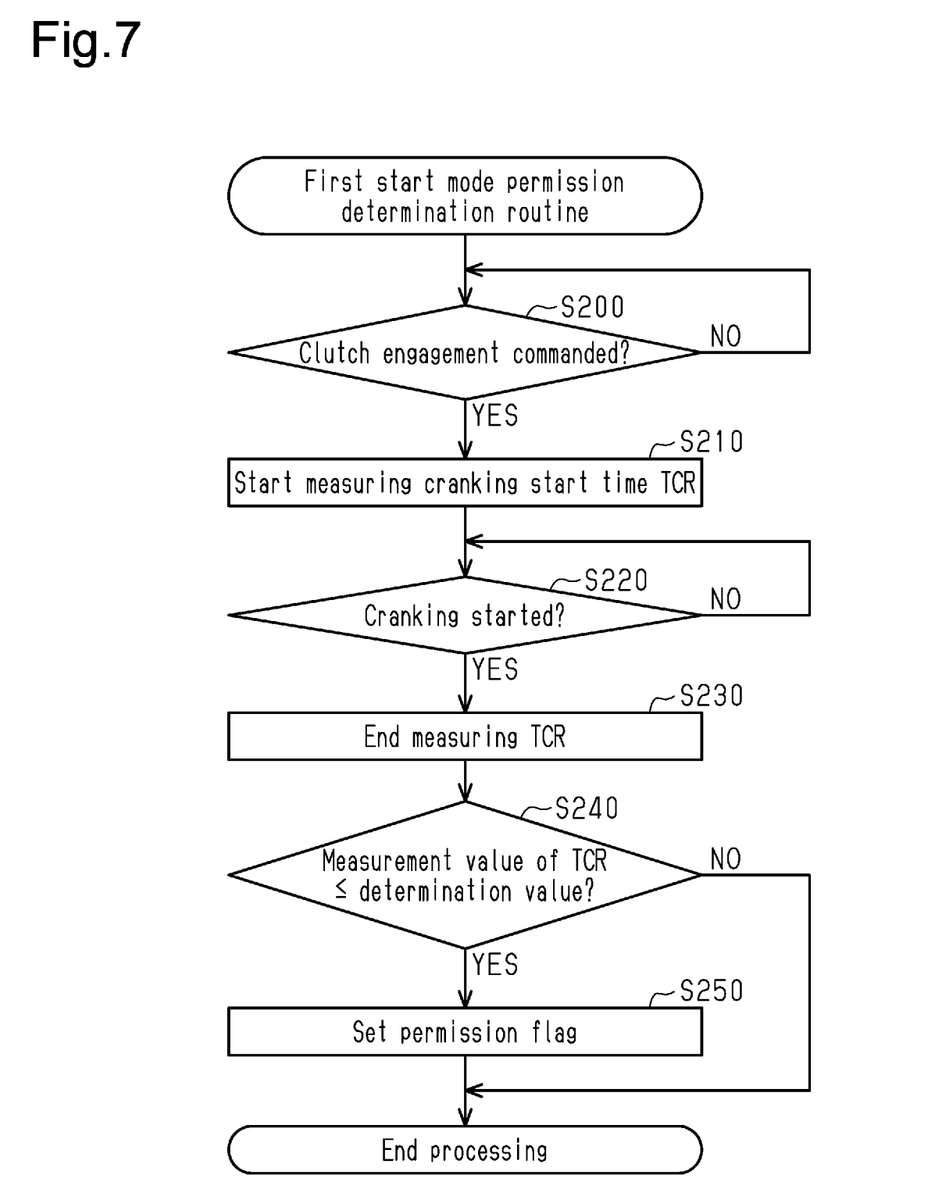
FIG. 7 is a flowchart illustrating a first start mode permission routine executed by the controller of FIG. 1.

FIG. 7 shows a flowchart of the first start mode permission determination routine. The vehicle control unit 23 executes the processing of FIG. 7 during restarting of the engine 10 in the second start mode that is performed when the second start mode is selected in the start mode selection routine.

After the processing of the routine is started, when engagement of the clutch 14 is commanded (S200: YES), the vehicle control unit 23 starts measuring the cranking start time TCR (S210). When confirming from the detection result of the crank angle sensor 34 that the rotation of the crankshaft 33 has been started (i.e., that cranking has been started) (S220: YES), the vehicle control unit 23 ends measuring the cranking start time TCR (S230). That is, the time from when engagement of the clutch 14 is commanded to when the transmission of torque through the clutch 14 is started is obtained as a measurement value of the cranking start time TCR.

Subsequently, in step S240, the vehicle control unit 23 determines whether the measurement value of the cranking start time TCR is less than or equal to a determination value. When determining that the measurement value of the cranking start time TCR is less than or equal to the determination value (S240: YES), the vehicle control unit 23 sets the permission flag in step S250 and then ends the routine. When determining that the measurement value of the cranking start time TCR exceeds the determination value (S240: NO), the vehicle control unit 23 ends the processing of the routine without operating the permission flag (i.e., ends the processing of the routine by keeping the permission flag cleared).

In the present embodiment, when the engine 10 is restarted in the first start mode, engagement of the clutch 14 is commanded. Then, when a fixed time has passed, ignition in the expansion stroke stopped cylinder is performed. In the following description, the fixed time is referred to as a "combustion start time." The same time as the combustion start time is used for the determination value.

The operation and advantages of the present embodiment will now be described.

In the present embodiment, since the permission flag has been cleared when the vehicle is activated, the first restarting of the engine 10 after the activation of the vehicle is performed in the second start mode. When the engine 10 is restarted in the second start mode, the cranking start time TCR is measured. When the time exceeding the combustion start time is measured as the cranking start time TCR, the permission flag is not set. Thus, the next restarting of the engine 10 is performed in the second start mode to measure the cranking start time TCR again. When the time less than or equal to the combustion start time is measured as the cranking start time TCR, the permission flag is set to restart the engine 10 in the first start mode after the next time.

The present embodiment has the following advantages.

(1) After the vehicle is activated, the cranking start time TCR is measured when the engine 10 is restarted in the second start mode. The engine 10 is not restarted in the first start mode at least until completion of the measurement of the cranking start time TCR. Thus, the engine 10 can be restarted in the first start mode such that cranking can be started by the timing of starting combustion. Accordingly, the engine 10 can be restarted in the first start mode in a range in which the startability does not worsen.

(2) In the present embodiment, the cranking start time TCR is measured when the engine 10 is restarted in the second start mode, and the engine 10 is prohibited from being restarted in the first start mode while the measured cranking start time TCR is greater than the combustion start time. That is, only when it is confirmed that cranking can be started by the timing of starting combustion in the expansion stroke stopped cylinder, the engine 10 is restarted in the first start mode. Thus, the engine 10 can be restarted in the first start mode in the range in which the startability does not worsen. This consequently expands the travel region in which the vehicle can travel in the first travel mode.

Second Embodiment

A controller and a control method for a hybrid vehicle according to a second embodiment will now be described with reference to FIG. 8. In the second embodiment, the same reference numerals are given to those components that the same as the corresponding components of the above-described first embodiment and detailed description thereof is omitted.

In the first embodiment, the combustion start time in the first start mode is fixed. In the second embodiment, the combustion start time is variably set based on the measurement result of the cranking start time TCR when the engine 10 is restarted in the second start mode.

Figure 8:
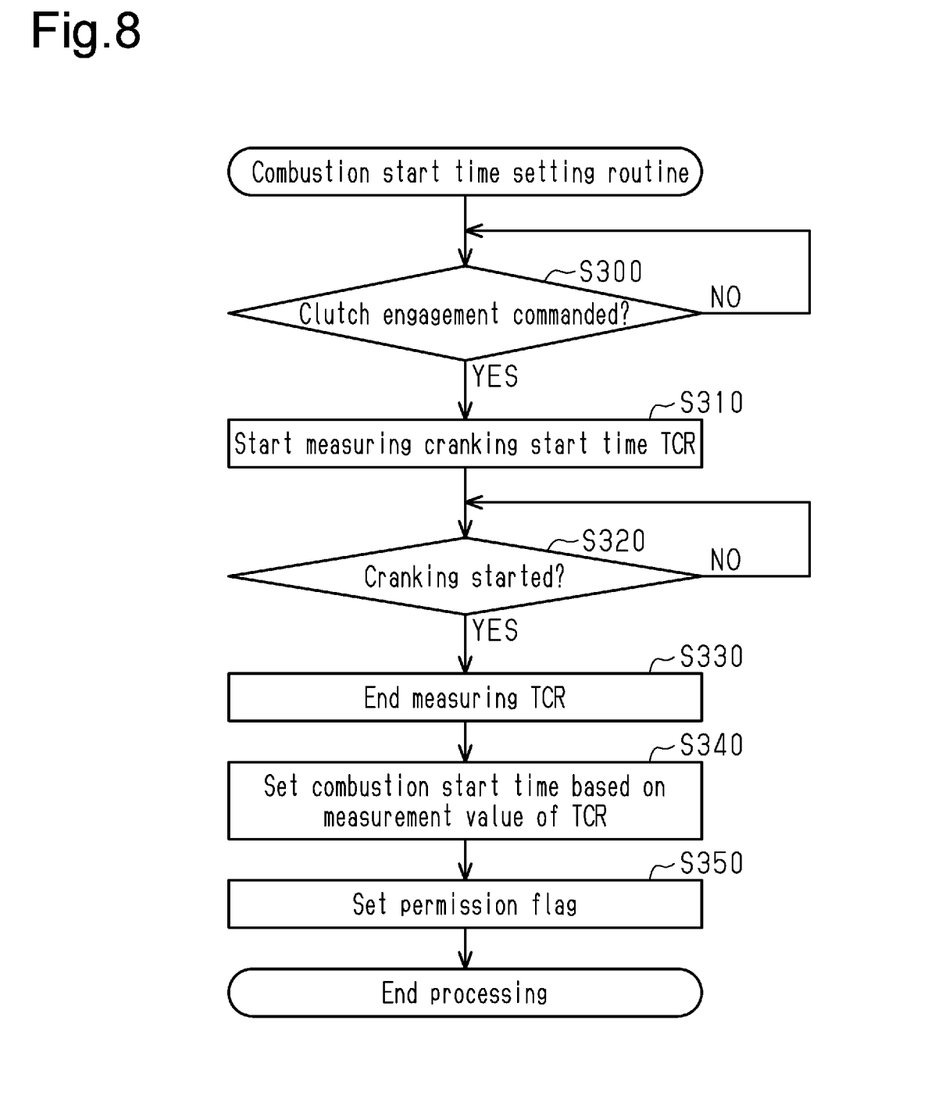
FIG. 8 is a flowchart illustrating a combustion start time setting routine executed by a controller for a hybrid vehicle according to a second embodiment.

FIG. 8 shows a flowchart of the combustion start time setting routine. In the present embodiment, the vehicle control unit 23 executes the processing of FIG. 8 instead of the first start mode permission determination routine of FIG. 7 during restarting of the engine 10 in the second start mode that is performed when the second start mode is selected in the start mode selection routine of FIG. 6.

After the processing of the routine is started, when engagement of the clutch 14 is commanded (S300: YES), the vehicle control unit 23 starts measuring the cranking start time TCR (S310). When confirming that cranking has been started (S320: YES), the vehicle control unit 23 ends measuring the cranking start time TCR (S330).

Subsequently, in step S340, the vehicle control unit 23 sets the combustion start time based on the measurement value of the cranking start time TCR. For example, the time that is slightly shorter than the measurement value of the cranking start time TCR is set as the value of the combustion start time. Then, in the subsequent step S350, the vehicle control unit 23 sets the permission flag and then ends the processing of the routine.

The operation and advantages of the present embodiment will now be described.

In the present embodiment, the first restarting of the engine 10 after activation of the vehicle is performed in the second start mode. During the restarting of the engine 10 in the second start mode, the cranking start time TCR is measured and the combustion start time is set based on the measurement value.

Restarting of the engine 10 after the second time subsequent to the activation of the vehicle is performed in the first start mode. The restarting of the engine 10 in the first start mode is performed based on the combustion start time that is slightly shorter than the cranking start time TCR that has been measured earlier. That is, the combustion start time is set to be longer as the time measured as the cranking start time TCR is longer.

The present embodiment has the following advantages.

(1) In the present embodiment, the engine 10 is restarted in the first start mode by setting the combustion start time to be longer as the time measured as the cranking start time TCR is longer. Thus, even when the cranking start time TCR is long, combustion in the expansion stroke stopped cylinder can be performed at the same time as when cranking is started. That is, regardless of the variations in the cranking start time TCR, combustion can be started at the timing at which cranking is started. Accordingly, the engine 10 can be restarted in the first start mode in the range in which the startability does not worsen. This consequently expands the travel region in which the vehicle can travel in the first travel mode.

The above-described embodiments may be modified as follows. The above-described embodiments and the following modifications can be combined as long as the combined modifications remain technically consistent with each other.

Instead of the multi-speed automatic transmission, a continuously variable transmission may be employed.

In addition to the first travel mode and the second travel mode, the travel mode may include an additional travel mode.

In addition to the first start mode and the second start mode, the start mode may include an additional start mode.

The vehicle control unit 23 may be processing circuitry including: 1) one or more processors that operate according to a computer program (software); 2) one or more dedicated hardware circuits such as application specific integrated circuits (ASIC) that execute at least part of various processes, or 3) a combination thereof. The processor includes a CPU and memories such as a RAM and a ROM. The memories store program codes or commands configured to cause the CPU to execute various processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a hybrid vehicle, the hybrid vehicle including a motor arranged on a power transmission path between an engine and a wheel and including a clutch arranged on a portion of the power transmission path between the engine and the motor, the controller being configured to switch between stopping operation of the engine with the clutch disengaged and operating the engine with the clutch engaged, wherein
   the controller comprises processing circuitry configured to select a start mode from multiple start modes and restart the engine in the selected start mode,
   the multiple start modes include a first start mode of commanding engagement of the clutch and starting combustion in the engine when the clutch starts transmitting torque and a second start mode of commanding engagement of the clutch and starting combustion in the engine after rotation of the engine is started by the torque transmitted from the motor through the clutch, and
   the processing circuitry is configured to:
      in a case in which the engine is restarted in the second start mode, measure a cranking start time from when engagement of the clutch is commanded to when transmission of the torque through the clutch is started; and
      only when measurement of the cranking start time has been completed after the vehicle is activated, restart the engine in the first start mode.

2. The controller according to claim 1, wherein the processing circuitry is configured to prohibit the engine from being restarted in the first start mode while the measured cranking start time is greater than a given time.

3. The controller according to claim 1, wherein
   time from when engagement of the clutch is commanded to restart the engine in the first start mode to when combustion in the engine is started is referred to as a combustion start time, and
   the processing circuitry is configured to set the combustion start time to be longer as the measured cranking start time is longer.

4. A control method for a hybrid vehicle, the hybrid vehicle including a motor arranged on a power transmission path between an engine and a wheel and including a clutch arranged on a portion of the power transmission path between the engine and the motor, the control method comprising:

switching between stopping operation of the engine with the clutch disengaged and operating the engine with the clutch engaged;

selecting a start mode from multiple start modes and restarting the engine in the selected start mode, wherein the multiple start modes include a first start mode of commanding engagement of the clutch and starting combustion in the engine when the clutch starts transmitting torque and a second start mode of commanding engagement of the clutch and starting combustion in the engine after rotation of the engine is started by the torque transmitted from the motor through the clutch;

in a case in which the engine is restarted in the second start mode, measuring a cranking start time from when engagement of the clutch is commanded to when transmission of the torque through the clutch is started; and only when measurement of the cranking start time has been completed after the vehicle is activated, restarting the engine in the first start mode.

* * * * *